March 2, 1948. L. M. DOHANIAN 2,437,154
VERTICALLY PIVOTED AUTOMOBILE SIDE-WINDOW LAMINATED MIRROR
Filed Sept. 21, 1946
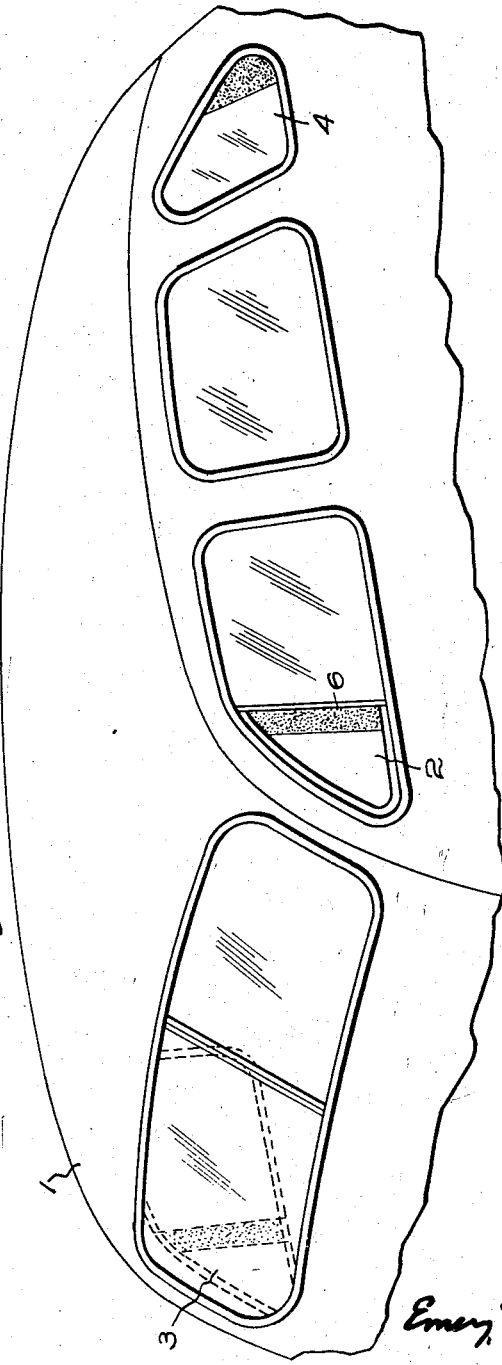
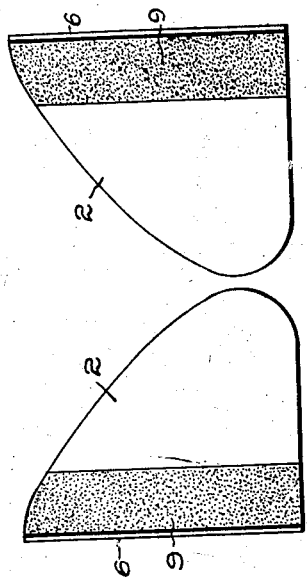
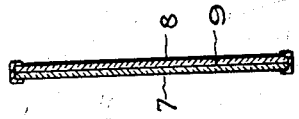
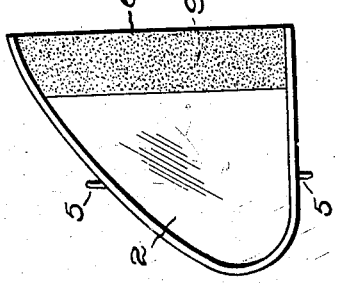
INVENTOR.
Luke M. Dohanian
BY
Emery Booth, Townsend, Miller & Dohanian
Attys Patented Mar. 2, 1948

2,437,154

UNITED STATES PATENT OFFICE 2,437,154

VERTICALLY PIVOTED AUTOMOBILE SIDE-WINDOW LAMINATED MIRROR

Luke M. Dohanian, Somerville, Mass.

Application September 21, 1946, Serial No. 698,507

1 Claim. (Cl. 88—93)

This invention relates to automobiles and to vertically pivoted, side-window construction thereof.

In order that the principle of the invention may be readily understood, I have disclosed a single embodiment thereof in the accompanying drawing, wherein—

Fig. 1 is a perspective view of an automobile having my invention applied thereto;

Fig. 2 is a plan view of a vertically pivoted, automobile window construction in accordance with the preferred embodiment of my invention;

Fig. 3 is a vertical cross section of the automobile window shown in Fig. 2; and Fig. 4 is a perspective view of the two glasses that form the window shown in Fig. 2.

I am well aware that mirrors have for many years been applied to windshields and windows of automobiles, but so far as I am aware no satisfactory construction has been provided that will reflect to the driver or to a person sitting next to a side window, a car approaching from the rear.

I have in accordance with my invention provided an automobile with at least one vertically pivoted side window, a vertical free edge portion whereof remote from the said pivot thereof is provided with a flat mirror at the inner surface of the window, whereby, when the automobile is in motion, a vehicle approaching from the rear at the side of the automobile where the said window is located may be readily seen in said mirror by the person seated next to said window, when said window has its said free edge swung outward.

I preferably provide such a vertically pivoted window with the herein described mirror construction not only next adjacent the driver's seat or driver's end of the front seat, but also at the opposite side of the car,—that is, at the other end of the said seat. I may also if desired provide the hereinafter described construction at a rear side, vertically pivoted window or windows, and as hereinafter described I preferably make at least the inner (rear) free edge portion of said window or windows of two thicknesses of glass, upon the meeting faces of which I apply the reflecting coating of silver or other suitable material, so that there is thus provided a mirror at both the inner and outer surfaces of the free edge portion of the said window or windows. Thus, when the window is closed, and the automobile is stationary, a person about to enter the car at the side having such window mirror construction may use the outer surface of the window for self-inspection, and when seated inside the car next such window he or she may, when the car is in motion and the rear free edge of the window is swung outwardly, observe a car approaching from the rear and in its true proportions, since the mirror is a plane mirror and does not distort the image of the car approaching from the rear.

Referring more particularly to the drawing, I have in Fig. 1 indicated sufficiently the general construction of an automobile at 1, two, pivoted, opposite, front, side windows thereof at 2 and 3, and one pivoted, rear, side window at 4. Some types of automobiles do not have pivoted side windows. My invention is applicable to any automobile having at least one vertically pivoted, side window.

Referring more particularly to Fig. 2, I have therein indicated the vertically pivoted window shown in Fig. 1, at the driver's seat. Such window is provided at 5, 5 with any suitable type of pivot that permits the said window 2 to be swung thereon as upon a vertical axis. Such window is provided with a free rear edge at 6, and by providing a suitable mirror effect at the inner surface of the said window at or closely adjacent to said free edge, the driver or the person sitting next to said window, when the said rear free edge 6 is swung outward, may, by looking at the inner surface of said window at the said mirror portion, accurately observe a car approaching at that side from the rear, or may at any time, with the window in the described condition, see what is at the rear of the car at that side thereof.

Preferably but not necessarily and as indicated at 7, 8 in Figs. 3 and 4, I construct each such window throughout of two sheets of glass face-to-face, with a mirror-creating coating 9 of silver or other suitable material. Each of said sheets of glass 7, 8 is desirably only one half the thickness of the usual vertically-pivoted window located at the part of the automobile referred to. That is to say, if the usual thickness of the window is about one-half inch, I make each of the sheets of glass 7, 8 about one-quarter of an inch thick, and I unite them or correlate them in the usual or any desired manner, so as, for example, to provide a shatter-proof construction. Between said two sheets of glass 7, 8, for a suitable area both in width and height, I provide the mirror producing coating referred to. Preferably I make the width of the mirror about two and one-half inches and the height thereof about ten inches, or whatever may be the total height of that window. The width of the mirror area should not, however, be so great as to produce a blind spot of undue width.

Having thus described one illustrative embodiment of the invention, it is to be understood that although specific terms are employed, they are used in a generic and descriptive sense and not for purposes of limitation, the scope of the invention being set forth in the following claim.

I claim:

A vertically pivoted, automobile side-window structure which at least at the vertical free-edge rear portion of the window consists of two thicknesses of glass face-to-face and having a reflecting, relatively narrow coating applied to both of the meeting glass surfaces, but only at and throughout the said free, vertical, rear-edge portion of the said window, thereby leaving all the remainder of the window area devoid of such coating, one of said thicknesses of glass being of the full area of the said window and the other thickness of glass being of the full height of the first thickness of glass and of at least a width to provide, with said relatively narrow coating, a mirror of the full height of the said window but only of a width to provide a reflecting surface at a substantial portion of the window area along said rear-edge portion thereof by which, when the window is turned with its free rear edge outward, traffic approaching from the rear at the side of the automobile at which said window is located, can be observed, the said window construction providing a mirror at both the inner and the outer surfaces of the said window, but only at the said rear edge portion thereof, throughout the entire height of said window, whereby, when the said window is closed upon its said vertical pivot and the automobile is stationary, a person standing at the outside of the automobile may use the said mirror for self-inspection, and whereby, when the automobile is occupied and in motion and the said window is swung upon its said vertical pivot, so that its said free rear edge projects outward, the person seated next said window so swung upon its vertical pivot may accurately observe by said mirror a car approaching from the rear at that side of the automobile.

LUKE M. DOHANIAN.

REFERENCES CITED

The following references are of record in the file of this patent:

UNITED STATES PATENTS

| Number | Name | Date |
|---|---|---|
| 2,261,301 | Smith | Nov. 4, 1941 |
| 2,351,087 | Welsh | June 13, 1944 |

FOREIGN PATENTS

| Number | Country | Date |
|---|---|---|
| 325,301 | Great Britain | Feb. 20, 1930 |
| 503,192 | Great Britain | Mar. 29, 1939 |